May 27, 1947. O. KYLIN ET AL 2,421,206
HYDRAULIC BRAKE MECHANISM AND CONTROL THEREFOR
Filed May 12, 1943 5 Sheets-Sheet 1

HENRIK O. KYLIN
OSKAR KYLIN
*INVENTORS*

BY
*Haywood & Van Horn*
*their* ATTORNEYS

May 27, 1947.  O. KYLIN ET AL  2,421,206
HYDRAULIC BRAKE MECHANISM AND CONTROL THEREFOR
Filed May 12, 1943  5 Sheets-Sheet 5

HENRIK O. KYLIN
OSKAR KYLIN
INVENTORS

BY *Haugard & Sanbon*
*their* ATTORNEYS

Patented May 27, 1947

2,421,206

UNITED STATES PATENT OFFICE 2,421,206

HYDRAULIC BRAKE MECHANISM AND CONTROL THEREFOR

Oskar Kylin and Henrik O. Kylin, Cleveland Heights, Ohio, assignors to Bardons and Oliver, Inc., Cleveland, Ohio, a corporation of Ohio Application May 12, 1943, Serial No. 486,684

4 Claims. (Cl. 192—4)

Our invention is an improvement in machine tools and relates more particularly to a braking mechanism for slowing down or stopping a movable part of a machine tool such as the spindle of a turret lathe, preparatory to changing the rate of rotation of the spindle, and also relates to a control mechanism for selectively actuating the braking mechanism in timed relation with the actuation of a reversing clutch mechanism and means for selecting or preselecting the rate of the movable part.

The present invention is particularly adapted for use with a machine tool having means for selecting or preselecting the rate of movement of a movable part of the machine tool and a clutch mechanism. As an example, reference is made to Letters Patent No. 2,279,710 issued April 14, 1942, to Oskar Kylin and Henrik O. Kylin, for hydraulically operated means for selecting and preselecting the rate of rotation of the spindle of a turret lathe.

It is, therefore, one of the objects of the present invention to provide means for slowing down or stopping the movement of a movable member of a machine tool in order to quickly impart a different rate of movement thereto without damage to the transmission mechanism during said rate change.

Another object of the invention resides in the provision of single control means operatively associated with the braking means for actuating the same only during an idling cycle of the speed change transmission between rate changes.

A further object consists in a machine tool such as a turret lathe having a driven spindle and means for rotating the spindle at any one of a plurality of selected or preselected rates, and braking means for slowing down the spindle when changing from one spindle speed to another.

Another object of the invention is the provision of means of the above named character by which the operator of the machine tool may more quickly and safely effect a change in the rate of movement of a movable part.

Another object consists in the provision of a simple and effective power operated means for quickly slowing down the rotation of a movable part such as a lathe spindle preparatory to revolving the part at a substantially faster or slower selected rate.

Another object of the invention is to enable the operator of a machine tool, such as a turret lathe, to rapidly change the rate of rotation of the spindle from one of its highest capable rates of rotation to one of its lowest rates or vice versa, without danger of gear clashing or damage to the transmission drive or other associated parts of the tool.

A further object of the invention is to provide in a machine tool having means for selecting and preselecting any one of a plurality of gear ratios available in a selective speed transmission, including reversing clutch mechanisms for the transmission, and brake means for slowing down or stopping a movable part of the machine tool preparatory to changing the rate of movement thereof, of a single control means for actuating the said selecting and preselecting means, the clutch means and the brake means in a cycle of operations wherein the brake means may be actuated only during a period when the movable part is coasting or idling between rate changes.

A still further object of the invention consists in providing a single control means of the type defined, hydraulically actuating the means effecting a rate change in the movable part of the machine tool and for hydraulically actuating said brake means to slow up or stop the movement of the movable part between rate changes.

Another object of the invention is to provide a single control means for hydraulically slowing down a moving part of a machine tool preparatory to changing the rate of movement of said part, and then hydraulically effecting a rate change in said part.

A further object of the invention is to provide a control means of the class described which is movable about one axis from one extreme position to first effect a drive for a movable part of a machine tool at a selected rate in one direction, then disconnecting said drive and then movable about another axis to effect a rate change in the drive, then applying a braking action to slow up or stop the movable part and then movable to drive said part at a different preselected rate in either direction.

Other objects of the invention will become more apparent as the following description of an embodiment thereof progresses, reference being made to the accompanying drawings in which like reference characters are employed to designate like parts throughout the same.

Referring more particularly to the drawings which illustrate an embodiment of the invention as applied to a turret lathe, the bed of the lathe is shown at 1. A head stock 2 houses a suitable transmission mechanism and is provided with a cover 3.

The spindle is indicated at 4 and is driven at selected or preselected rates through a selective transmission gearing in the head stock and a suitable reversing clutch mechanism which will presently be described.

Figure 1:
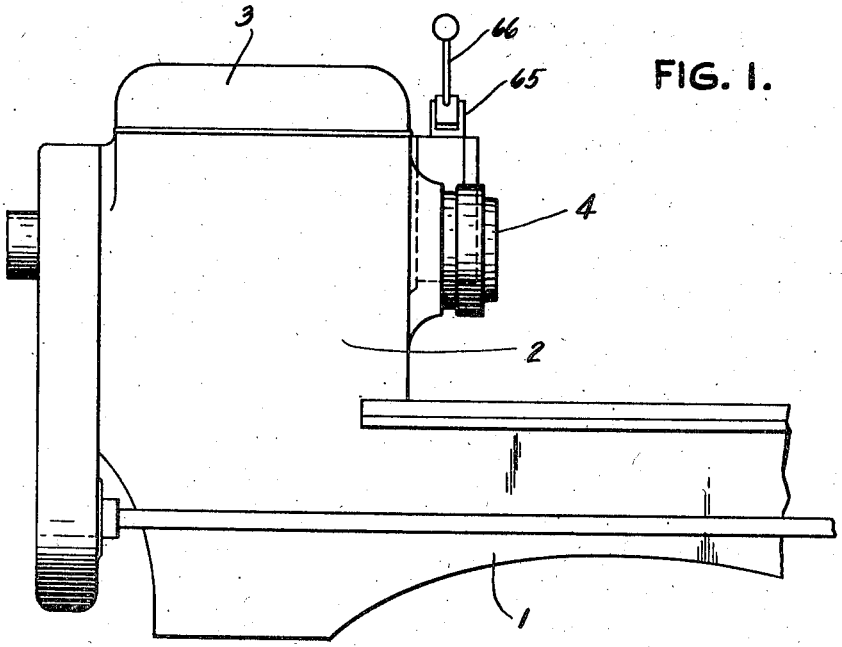
Figure 1 is a side elevation of the head stock of a machine tool showing a control means for effecting operation of our invention.
Figure 2:
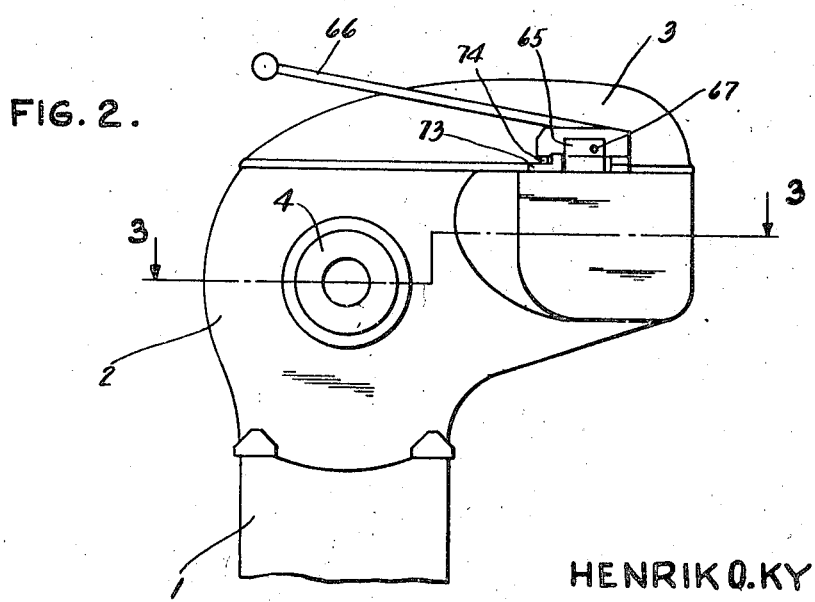
Figure 2 is a view of the spindle end of the headstock and shows the control means in side elevation.
Figure 3:
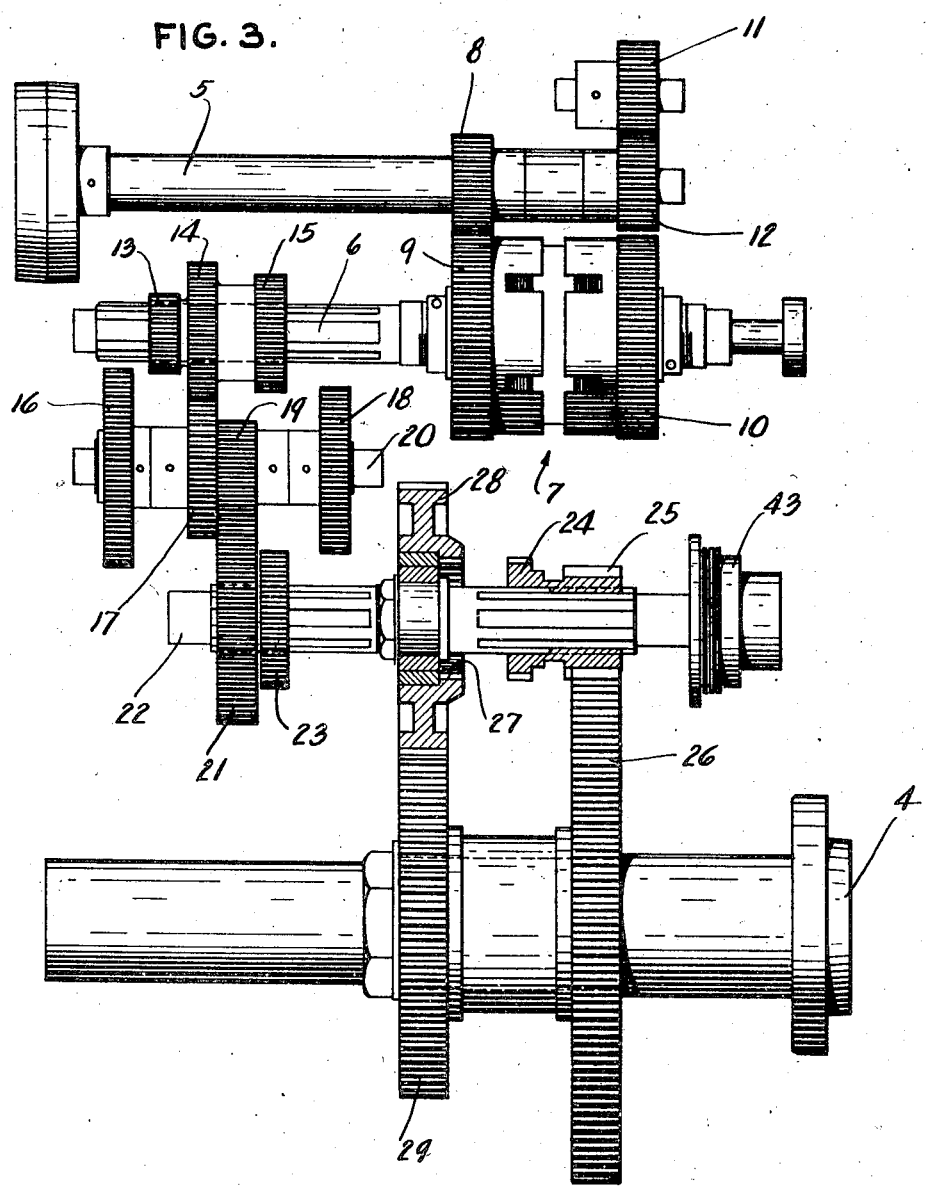
Figure 3 is a developed view of the transmission gearing within the head of the machine taken on line 3—3 of Figure 2 showing the spindle braking means and the clutch mechanism.

In Figure 3, power may be applied to drive the shaft 5 which in turn drives the shaft 6 through the reversing clutch indicated generally at 7. A pinion 8 on shaft 5 meshes with the forward clutch gear 9 while the reverse clutch gear 10 is driven through an idler or reversing gear 11 in mesh therewith and with the gear 12 keyed to the shaft 5.

A sliding gear cluster comprising the gears 13, 14 and 15 is splined to slide axially of the shaft 6, there being the usual shifting fingers (not shown) employed to slide the cluster to selectively engage the gears 13 and 16, 14 and 17 or 15 and 18 as desired. Each of the gears 16, 17 and 18 and a gear 19 are keyed to rotate with the shaft 20.

The gear 19 is in mesh with a gear 21 in the position shown in Figure 3 to drive the shaft 22, the gears 21 and 23 constituting a cluster splined on the shaft 22 so that the cluster may also be positioned to engage the gears 18 and 23. Also splined to slide on the brake shaft 22 is a gear cluster comprising the gears 24 and 25. In the position shown in Figure 3 the gear 25 is in mesh with the spindle gear 26. When the cluster 24—25 is shifted to the left so that the gear 24 meshes with the internal gear 27, the drive will be through the shaft 22, gear 24, gear 28 to the second spindle gear 29.

Figure 5:
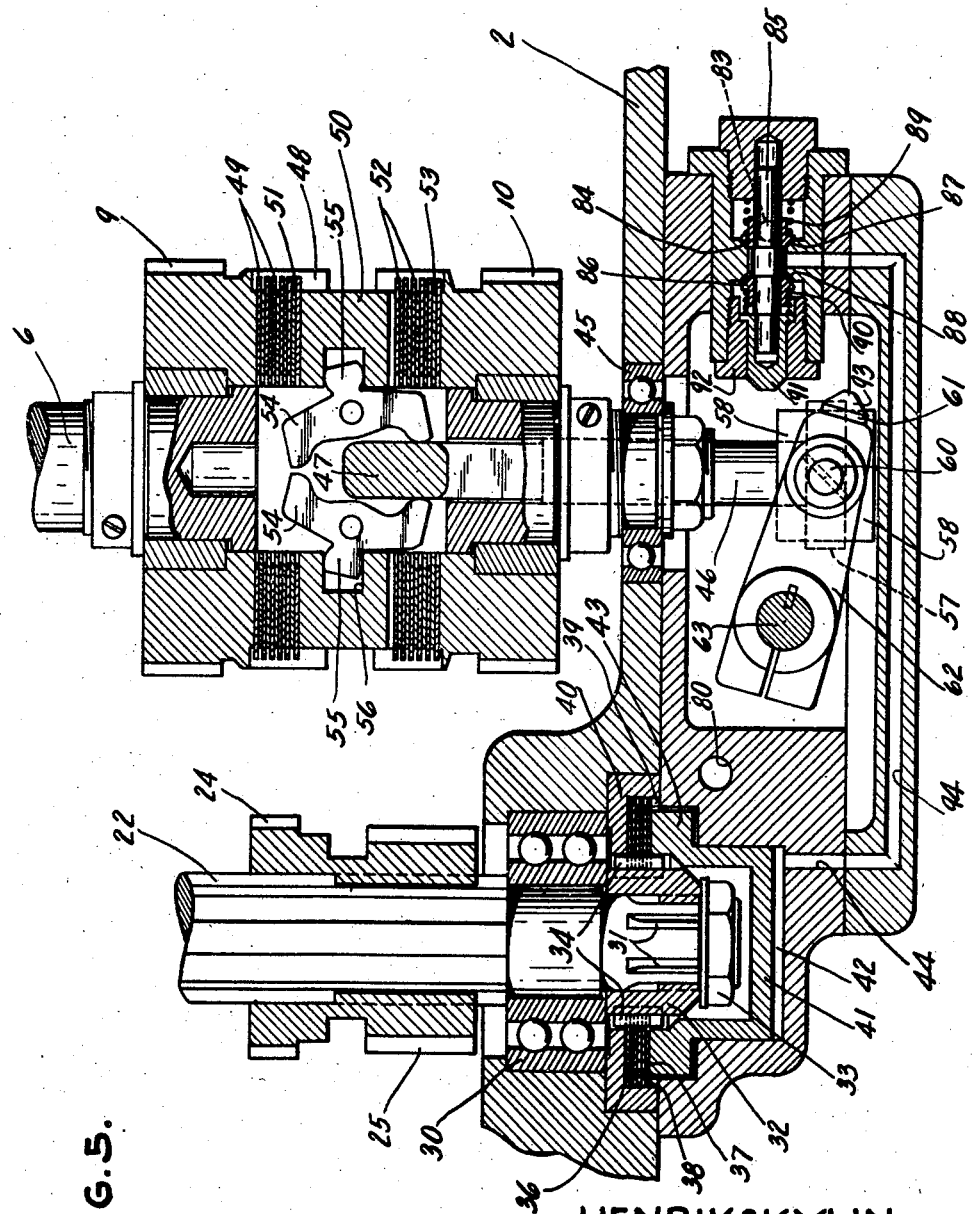
Figure 5 is a section taken on line 5—5 of Figure 4.

Referring now more particularly to Figure 5 it will be seen that we have provided a fluid operated brake means for the shaft 22. The end of the shaft 22 is rotatably carried in a bearing 30 and is splined at 31 to receive a brake member 32. The member 32 is locked on the end of the shaft 22 by means of a nut 33 and is provided with ribs 34 for engaging the notches 35 of the friction plates 36. Alternating with the friction plates or discs 36 are similar discs 37 provided with radial projections 38 which seat in grooves 39 of the fixed member 40.

A brake piston or plunger 41 operates in the cylinder 42 and is formed inwardly of its head with an annular pressure flange 43 which is adapted to press the discs 36 and 37 into close frictional engagement, sufficient to slow up or stop rotation of the shaft 22 when the latter is idling or coasting preparatory to a change in the driven rate of rotation of the spindle 4.

Thus when sufficient fluid pressure is applied to the piston 41 through the port 44 the piston will be forced axially toward the end of the shaft 22 to frictionally engage the relatively rotating discs 36 and 37 and to thereby slow up or stop the coasting shaft 22. Likewise when the fluid pressure is released, the friction between the discs will be relieved to such an extent that there will be no braking action on the shaft 22 and consequently none on the spindle 4.

We have also illustrated in Figure 5, a form of reversing clutch which is operable to complete the spindle drive either forward or in reverse, and which is so associated with the brake and intermediate control mechanism that the operator may only brake the spindle shaft while the latter is coasting, that is, disconnected from the selective transmission drive.

The shaft 6 is supported at its inner end in a bearing 45 in the head stock 2 and is formed to slidably receive a clutch operating rod 46 having a wedge member 47 formed on its outer end.

The forward clutch gear 9 is formed with in inwardly extending clutch disc holder 48 which carries the discs 49, while the shiftable clutch member 50 carries a series of clutch discs 51 alternating with the discs 49. Likewise a reverse clutch gear 10 carries a plurality of clutch discs 52 having frictional engagement with adjacent alternate discs 53 carried by the sliding clutch member 50. The member 50 is slidable axially of the shaft 6 to frictionally engage its discs 51 and 53 with the discs or plates 49 and 52 respectively to effect a forward or reverse drive through the clutch and between the driven shaft 5 and shaft 6. The wedge 47 operates axially of the shaft 6 and between a pair of pivoted clutch fingers 54 each having a projection 55 in a recess 56 of the clutch member to shift the said member either toward forward clutch engagement or reverse engagement. At the extreme inner end of the rod or shaft 46 there is provided a head 57 which rotates with the shaft 46 between the depending sides of 58 of the member 59. A stud 60 on the member 59 provides a fulcrum for a valve actuator arm 61 carried by the actuator member 62. The member 62 and the arm 61 are both operated as a unit about a center defined by the axis of the control shaft 63 to which the member 62 is secured as at 64. The control shaft 63 extends upwardly through the casing 3, and terminates in a head 65 which pivotally supports a control lever 66 at 67. A forward extension 68 of the lever 66 is formed integral therewith and carries a spring pressed plunger 69, the lower end of which engages the top surface of the head at 70 to normally urge the lever 65 in a raised position. At the outermost portion of the extension, a nose 71 carrying a registering member or stop 72 on its underside, is movable over a plate 73 mounted on the casing 3. The plate 73, as shown more clearly in Figure 6 to 9 inclusive, is provided with an opening through which the control valve stem 74 projects, and spaced lands 75 and 76, extending above the upper level of the plate. The space between the lands forms a depression 77 for receiving the stop 72 of the lever 66 when the lever is in position aligning the stop with the depression and the lever is depressed. With the parts in this position, and the lever depressed, the control valve stem 74 is depressed against the compression of the spring 78 thus operating the control valve 79 and admitting fluid under pressure from the port 80 and the duct 82 to the line represented by the port 81 which leads to suitable control means for hydraulically preselecting and selecting the several gear ratios of the hydraulic transmission with which the invention is associated.

Fluid under pressure is also delivered from the conduits 82 and 83 to one side of an hydraulic brake control valve. This valve may consist of a shaft 85 carrying the valve heads 84 and 86 seating in one of the other of the respective valve seats 87 and 88 depending upon the axial displacement of the valve shaft 85. A pair of compression springs 89 and 90, the former having a greater force of compression than the latter, are provided to normally seat the valve 84 in its seat 87 and to partially overcome the compression of the stronger spring 89 respectively. The spring 90 also assists in movement of the valve stem 85 to the right when the plunger 91 it pressed inwardly of the valve casing 92 by the contact with the inclined walls 93 of the actuator member 61.

With the valve in the position shown in Figure 5, the valve head 84 will be against its seat 87 and will cut off pressure fluid communication between the source through conduit 83 and the conduit 94 leading from the opposite side of the valve seat 87 to the brake cylinder 42. But when the arm 61 is moved so that its end 93 engages and depresses the valve stem 85 to the right in Figure 5 against the compression of the spring 89, the valve head 86 will seat in the valve seat 88, while the valve 84 will be unseated, thus permitting fluid under pressure to pass from the conduit 83 past the valve and into the conduit 94 and brake cylinder 42 to actuate the brake plunger 41. In this manner the discs 36 and 37 will be frictionally engaged under pressure of the fluid to the extent that an effective braking action will be imparted to slow down or stop the shaft 22 and consequently the spindle 4

As illustrated in Figures 6 to 9 inclusive, we have shown the several positions of the control lever with respect to the main control valve 79 for selecting and preselecting different gear ratios available in the selective transmission, and also with respect to the brake control valve.

Figure 6:
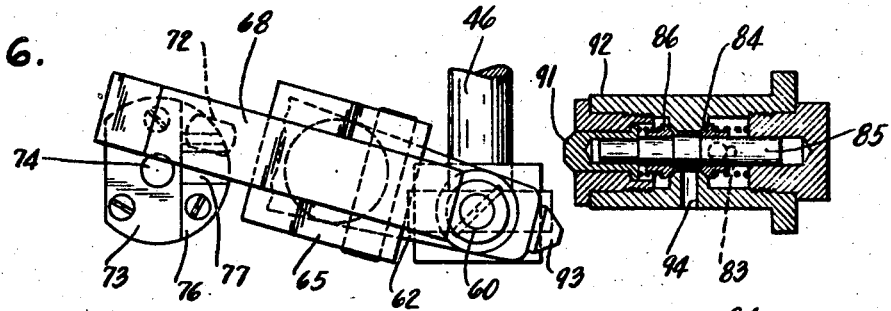
Figure 6 illustrates the relative positions of the control means and the brake actuating valve when the forward clutch is closed and the brake is off or released.

In Figure 6 the control lever 66 is in proper position for effecting a closed forward clutch, while the brake is released, that is, the shaft 46 will be withdrawn in a forward direction as illustrated in Figure 5. With the parts in the position shown in this figure, the wedge 47 will actuate the clutch fingers 54 to shift the clutch member 50 toward the clutch discs 51, thus frictionally engaging these discs with the discs 49, thereby closing the clutch in forward position. With the clutch closed in forward position the drive will then be from shaft 5 through pinion 8 and clutch gear 9 to shaft 6, through the selective transmission cluster to drive the shaft 22 at the selected rate. The drive to the pinion shaft 4 may be selectively completed through gears 25 and 26 or through gears 24, 28 and 29 when the cluster 24—25 is shifted to engage gear 24 with the internal gear 27. Since the shaft 22 also carries the brake 43, the braking action will be applied directly to this shaft when the brake is actuated. However, it will be noted from Figure 6 that the brake will not be actuated while the actuator arm is out of engagement with the brake valve plunger 91. It will also be noted in connection with Figure 6 that the lever 66 is incapable of being dipped or swung in a downward position since the abutment 72 overlies one of the lands 75 and is not in registration with the depression 77 between the two lands 75 and 76. Thus, in this position of the actuator arm, the brake will be off and the spindle will be driven at a selected or preselected speed through the closing of the forward clutch mechanism.

Figure 4:
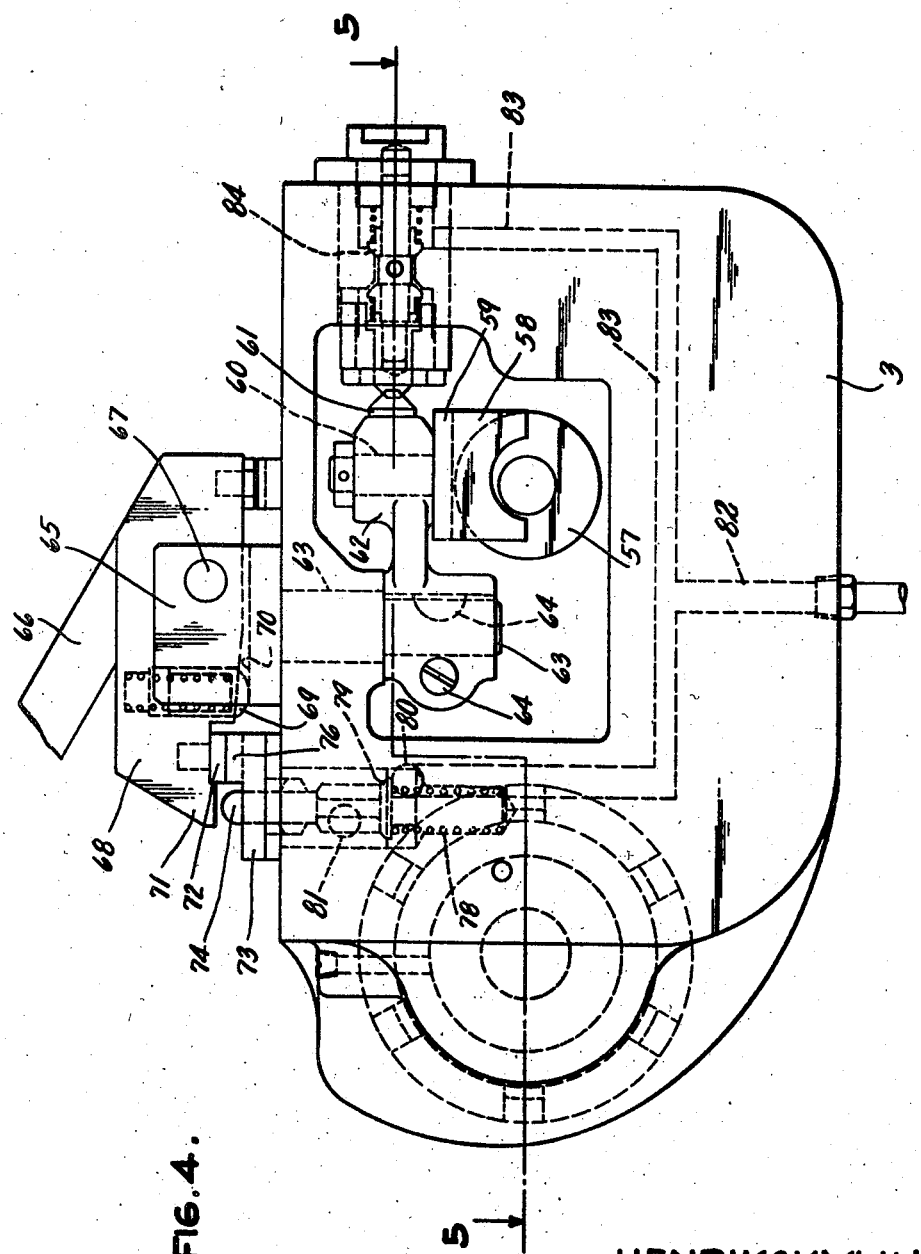
Figure 4 is an enlarged view of a portion of the head stock shown in Figure 2, and shows the relative positions of some of the parts including the rate changing control valve, the brake, and the brake and clutch actuating mechanism.
Figure 7:
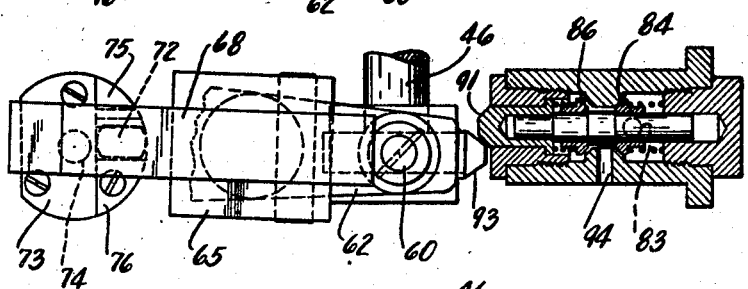
Figure 7 is a view similar to that of Figure 6 showing the parts in a position during which the spindle is coasting just prior to application of the brake.

With reference to Figure 7 the same parts are illustrated as in Figure 6 except that the lever 66 has been shifted about a vertical axis to the next position which, it will be seen, is such that the brake is still released but the abutment 72 will be in register with the depression 77 between the lands 75 and 76. In this position of the parts the lever 66 may be dipped or rotated slightly downwardly about the horizontal axis at 67 to depress the selector or preselector control valve 74. When this valve is open, fluid under pressure will flow from the source as received by conduit 82 in Figure 4 through the port 80 and around the valve 79 and outwardly through the port 81 from which it is delivered to suitable distributing and actuating mechanism for operating the several gear clusters of the selective speed transmission in accordance with a selected or preselected spindle speed. Of course, at spindle speeds above approximately 90 it is advisable to dwell at this position of the lever 66 while coasting. It will be noted that during this step in the operation the end 93 of the actuator arm is still out of engagement with the brake valve plunger 91 and consequently the brake will remain in off position. In moving the lever 66 to the position shown in Figure 7, the forward clutch will be released since the clutch shaft 46 is moved slightly inwardly of the clutch sufficiently to bring the wedge 47 between the opposed ends of the fingers 54. This results in the clutch member 50 being shifted slightly downwardly as viewed in Figure 5 so that the frictional engagement between the discs 49 and 51 is relieved. During this step in the operation, the clutch member 50 is not moved downwardly sufficiently to engage the clutch discs 52 and 53 of the reverse clutch gear 10.

Figure 8:
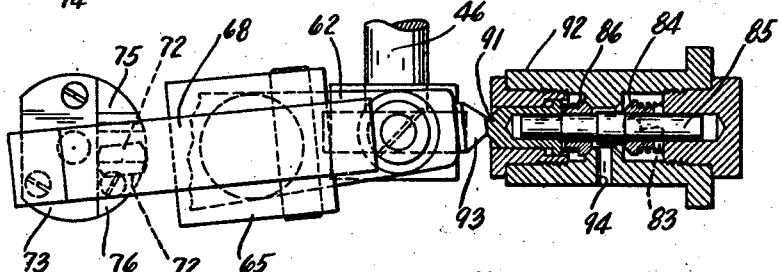
Figure 8 is another similar view representing the next step or position of the control means in which the brake is applied to slow down or stop and lock the coasting spindle.

In Figure 8 the abutment 72 having been lifted with the lever after the previous operation by means of the spring pressed plunger 68, now partially overlies the land 76 sufficiently to prevent depression of the lever as in the former step in the operation. While the actuator arm is in the position shown in Figure 8, the end 93 will be in engagement with the valve plunger 91 and will have depressed the plunger and the valve stem 85 sufficiently to open the valve 84 and to close the valve 86. When the valve 84 is opened, fluid under pressure, which is fed to the valve casing 92 through a conduit 83, is admitted around the valve 84 and past the seat 86 and into the conduit 94 where it is conveyed to the brake cylinder 42 as illustrated in Figure 5 to thrust the brake plunger 41 in the direction of the brake discs 36 and 37 to frictionally engage them to the extent that an effective braking action will be applied to the shaft 22 to slow up or stop the same depending upon the length of time the lever 66 remains in this position. With the parts shown in the position illustrated in Figure 8, it will be noted that the abutment 72 only partially overlies the land 76 and in such position this limited movement of the actuator 62 from the position illustrated in the previous figure is insufficient to close the reversing clutch. Therefore, during this position of the parts the gears of the transmission are still free to coast while the brake is applied to the spindle shaft.

Figure 9:
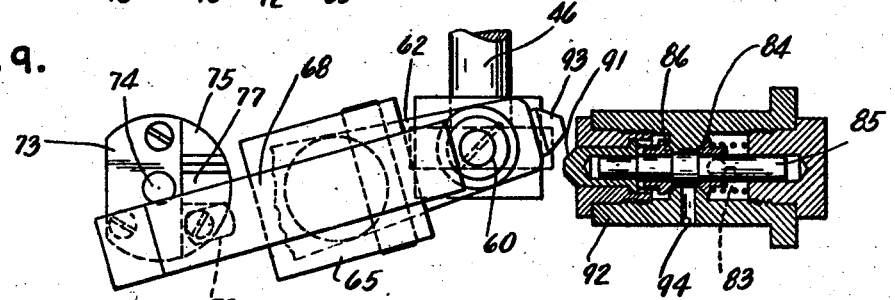
Figure 9 illustrates the reverse clutch closed and the brake released.
Figure 10:
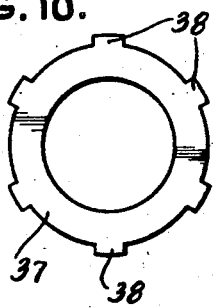
Figure 10 is a front view of one of the brake friction plates or rings.
Figure 11:
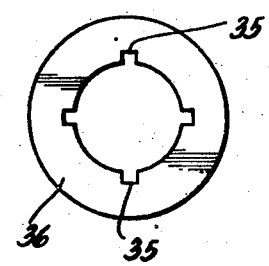
Figure 11 is a front view of one of the complementary brake friction plates or rings.

In Figure 9 we have shown the next and final position of the actuator 62 in which it will be seen that the actuator arm 83 is again out of engagement with the brake valve plunger 91 allowing the plunger to again project to the positions shown in Figures 6 and 7 and closing the valve 84 to thereby disconnect the conduit 94 from the source of the fluid under pressure. Since the valve 86 is opened, pressure may be relieved from the brake cylinder back past the valve 86. It will be noted that the abutment 72 now completely overlies the land 76 and that in this extreme position of the actuator arm 62 the clutch shaft 46 is moved axially toward the opposite end of the clutch sufficiently to cause the wedge member 47 to engage the opposite ends of fingers 54 and to thereby shift the clutch member 50 toward the discs 52 and 53 to effect sufficient frictional engagement therebetween for driving the reverse clutch gear 10. With the reverse clutch closed, the drive will be from shaft 5 through pinion 12, reversing pinion 11 and reversed clutch gear 10 to the shaft 6.

It will be noted, however, that the operator may not desire to go into the reverse clutch position as shown in Figure 9, but may elect to merely change the spindle speed in a forward direction only. In such a case he may proceed through the steps illustrated in Figures 6, 7 and 8 and, having slowed down or stopped the spindle as shown in Figure 8, he may then proceed to return the actuator and control lever 66 to the position shown in Figure 6 to reengage the forward clutch and thus perfect the drive to the spindle at the newly selected rate.

From the foregoing it will be readily understood that the present invention provides a simple control means for quickly and sequentially or selectively actuating a reversible clutch mechanism, a braking mechanism and means for selecting and preselecting any one of available gear ratios for the moving of a movable part of a machine tool at any one of selected or preselected rates without danger of accidental clashing of gears and attendant damage thereto.

Furthermore, the present invention provides simple and efficient means for effecting a timely braking action on a movable part of a machine tool to slow down or stop the same, while the same is disconnected from its drive, and in particular providing a hydraulic braking mechanism which is effective to quickly slow down or stop a moving spindle shaft between the application of selected or preselected spindle speeds.

We claim:

1. In a machine tool having a part movable at a preselected rate, means for preselecting the rate of said movable part, a drive for said part including a reversing clutch mechanism, a brake acting directly on said movable part, a single control means for operating said brake and said reversing clutch mechanism, a clutch shaft directly operable by said control means, and means engageable by said control means and responsive to such engagement to actuate said brake, said control means being movable when said clutch mechanism is disengaged to select a rate change for said movable part, and means associated with said movable part and responsive to said control means to select a rate change for said movable part.

2. In a machine tool having a part movable at preselected rate, a drive for said part, including a clutch, and a selective gear transmission, a brake for said movable part, a fluid motor for operating said brake, a single control means for effecting actuation of said clutch and said brake, said means being operatively connected with said clutch, a valve engaging member on said control, a valve in the path of movement of said member and engageable when the clutch is disengaged for effecting an actuation of the brake to thereby stop or slow up said movable part, and hydraulically operated means engageable by said control means to effect a preselected rate change.

3. In a machine tool having a part movable at preselected rate, a drive for said part including a selective gear transmission, a clutch, a brake for said movable part, means for selecting the rate of said movable part, fluid motors for operating said brake and said rate selecting means and a single control means operable selectively to actuate said clutch, brake and rate selecting means, means for controlling actuation of said brake, said control comprising a pivoted member having direct driving connection with said clutch, and having a portion movable in the path of and engaging said brake control means to slow down or stop said movable part when said clutch is released.

4. In a machine tool having a part movable at preselected rate, a drive for said part including a selective gear transmission, a clutch, a brake for said movable part, means for selecting the rate of said movable part, fluid motors for operating said brake and said rate selecting means and a single control means operable selectively to effect actuation of said clutch, brake and rate selecting means, hydraulic means for controlling the actuation of said brake, said control comprising a pivoted member having direct driving connection with said clutch, and having a portion movable in the path of and engaging said brake control means to slow down or stop said movable part when said clutch is released, said brake actuation control means including a valve operable by said single control means.

OSKAR KYLIN.
HENRIK KYLIN.

REFERENCES CITED

The following references are of record in the file of this patent:

UNITED STATES PATENTS

| Number | Name | Date |
| --- | --- | --- |
| 1,598,581 | Carlton | Aug. 31, 1926 |
| 1,795,018 | Foster | Mar. 3, 1931 |
| 2,050,245 | Carter | Aug. 11, 1936 |
| 2,050,520 | Carter | Aug. 11, 1936 |
| 2,148,326 | Siekmann | Feb. 21, 1939 |
| 2,167,790 | Whitehead et al. | Aug. 1, 1939 |
| 2,218,182 | Senger | Oct. 15, 1940 |
| 2,279,710 | Kylin et al. | Apr. 14, 1942 |
| 2,313,438 | Hoelscher | Mar. 9, 1943 |
| 2,323,753 | Jaeger et al. | July 6, 1943 |
| 2,330,580 | Hautsch | Sept. 28, 1943 |

FOREIGN PATENTS

| Number | Country | Date |
| --- | --- | --- |
| 606,507 | Germany | Dec. 4, 1934 |
| 409,836 | Great Britain | Dec. 30, 1932 |